3,129,136
CONTROLLING NEMATODES WITH 2-CHLORO-3-HYDROXY-4-NITRO-BENZALDEHYDE
David P. Mayer, Chicago, Ill., assignor to Velsicol Chemical Corporation, Chicago, Ill., a corporation of Illinois
No Drawing. Filed Nov. 17, 1961, Ser. No. 153,216
3 Claims. (Cl. 167—30)

This invention relates to a new nematocidal composition and a method for employment thereof. In particular, this invention relates to the use of 2-chloro-3-hydroxy-4-nitrobenzaldehyde as a nematocide.

While there are presently available some nematocidally active compounds, there is a never-ending need for additional materials.

It is therefore an object of the present invention to provide a new nematocide.

It has now been found that 2-chloro-3-hydroxy-4-nitrobenzaldehyde is a surprisingly effective nematocide useful for the control of undesirable strains.

This compound can be prepared by whatever method is appropriate, although a particularly acceptable method is by the nitration of 2-chloro-3-hydroxy benzaldehyde as described by Hudgson and Beard in J. Chem. Soc. (London), 2030–2036 (1926), beginning on page 2032.

Thus, for example, it can be specifically prepared as follows: 2-chloro-3-hydroxybenzaldehyde (50 grams; 0.32 mole) is dissolved in 50% aqueous acetic acid (210 ml.) in a glass reaction flask equipped with stirrer, thermometer, and heating mantle. This solution is heated to and held at 50–60° C. while nitric acid (50 cc.) is added, and for 15 minutes thereafter. Then the reaction mixture is cooled and added to ice (400 grams). The product is collected by filtration and heated in water (1200 ml.) at 90° C. and filtered. The filter cake is recrystallized from acetic acid and found to have a melting point of 165–168° C.

In order to ascertain the nematocidal activity of 2-chloro-3-hydroxy-4-nitrobenzaldehyde it was tested for its control of Meloidogyne species. These nematodes were reared in tomato plant-soil culture. This soil was inoculated with infected soil and root knots from infected tomato plants. 2-chloro-3-hydroxy-4-nitrobenzaldehyde was tested at a concentration of 100 pounds per four inch acre. It was formulated as a 10% dust for mixing with soil using a V-shell blender. Four one-point paper pots were use for each treatment with one tomato transplant per pot. After 3–4 weeks under artificial lighting and overhead irrigation, the roots of the plants were examined for degree of root knot formation. It was found that this test gave 90% control of the nematodes.

The active ingredient of this invention can be applied in a variety of ways to materials which are to be protected such as by dusting, spraying, dipping, tumbling or any of the other means known to the art. While it may be used in its pure form, it is normally more beneficial to use formulations of this active ingredient. Again, the art of formulation is well known and virtually all of the methods known to the art for the formulation of solid materials are applicable to the new novel composition of the present invention.

Thus, this active compound can be adsorbed onto a carrier for more efficient application. Carriers are relatively inert materials which will carry the active ingredient. There are numerous solid carriers known to the art, most of which can be used. They include the diatomaceous earths, mica, talc, fuller's earth, bentonite and various flours. Standard blenders can be used to mix the active ingredient and carrier in various concentrations from 0.1 to 99%, depending on the application, although normally 2–50% active ingredient will be sufficient. Then, too, during the blending of the carrier and active ingredient, if a wettable powder is desired, dispersing and wetting agents may be added to said mixture in quantities dependent on factors such as the concentration of the active ingredient, identity of the carrier, etc. These wettable powders disperse readily in water and the plant, seeds, bulbs, etc., can be dipped therein or the dispersion may be used as a spray.

Further, if desired, this active ingredient can be dissolved in a suitable solvent such as acetone, kerosene, etc., and sprayed onto the land, plants, leather goods or other material to be protected. Here the concentration of the active ingredient will depend on such factors as the application, solubility of the active ingredient in the particular solvent, and condition of the material being protected.

The following examples illustrate formulations of the compound of the present invention which are effective for use as nematocides:

Example 1

| | Percent by weight |
|---|---|
| 2-chloro-3-hydroxy-4-nitrobenzaldehyde | 70 |
| Celite 209 | 50 |

Celite 209 is a diatomaceous earth utilized as a relatively inert carrier. The composition represented here is a 50% dust or granular, depending on how fine it is ground.

Example 2

| | Percent by weight |
|---|---|
| 2-chloro-3-hydroxy-4-nitrobenzaldehyde | 75 |
| Micro-Cel 800 | 25 |

Micro-Cel 800 is a synthetic, relatively inert, porous carrier material basically composed of calcium silicate. The composition of this example is a 75% dust or granular, depending on the degree of grinding.

Example 3

| | Percent by weight |
|---|---|
| 2-chloro-3-hydroxy-4-nitrobenzaldehyde | 70 |
| Micro-Cel 800 | 27 |
| Triton X–100 | 3 |

Triton X–100 is a wetting agent, chemically an alkyl aryl polyether alcohol. This composition is a 70% wettable powder suitable for use by making a slurry thereof.

Example 4

| | Percent by weight |
|---|---|
| 2-chloro-3-hydroxy-4-nitrobenzaldehyde | 60 |
| Isopropyl acetate | 23 |
| Isopropyl alcohol | 10 |
| Atlas 6–1690 | 7 |

Altas 6–1690 is a commercially obtainable emulsifier while the acetate and alcohol serve as solvents. The formulation of this example is an emulsifiable concentrate.

The above examples illustrate formulations of the new, novel composition of the present invention. They are not meant to limit the invention in any manner, but merely illustrate some of the many useful formulations in which this compound may be utilized.

Other substances than the carrier, dispersion agent, wetting agent and emulsifier may be added in solid or liquid formulations of the active ingredient, if desired, such substances including spreaders, stickers and other auxiliary materials. Also, substances may be added to bring about various physical improvements such as prevention of lumping during storage, etc.

Various other modifications are possible and will occur to persons skilled in the art.

I claim:
1. A method for the control of nematodes which comprises applying to the locus of said nematodes a toxic quantity of 2-chloro-3-hydroxy-4-nitrobenzaldehyde.
2. A method for the control of nematodes which comprises impregnating nematode infested soil with a quantity which is injurious to the nematodes of 2-chloro-3-hydroxy-4-nitrobenzaldehyde.
3. A nematocidal composition of matter containing from about 2 to about 50 weight percent of 2-chloro-3-hydroxy-4-nitrobenzaldehyde as an essential nematocidally active component, wetting agents and an inert carrier.

References Cited in the file of this patent
FOREIGN PATENTS
258,060    Great Britain _____ Sept. 16, 1926

UNITED STATES PATENT OFFICE
CERTIFICATE OF CORRECTION

Patent No. 3,129,136                                         April 14, 1964

David P. Mayer

It is hereby certified that error appears in the above numbered patent requiring correction and that the said Letters Patent should read as corrected below.

Column 1, line 47, for "point" read -- pint --; column 2, line 23, for "70" read -- 50 --.

Signed and sealed this 20th day of October 1964.

(SEAL)
Attest:

ERNEST W. SWIDER
Attesting Officer

EDWARD J. BRENNER
Commissioner of Patents